United States Patent
Narukawa et al.

(10) Patent No.: US 8,221,691 B2
(45) Date of Patent: Jul. 17, 2012

(54) APPARATUS FOR PRODUCING TRICHLOROSILANE

(75) Inventors: Mitsutoshi Narukawa, Yokkaichi (JP); Yuji Shimizu, Naka-gun (JP)

(73) Assignees: Mitsubishi Materials Corporation, Tokyo (JP); Denki Kagaku Kogyo Kabushiki Kaisha, Tokyo (JP)

(*) Notice: Subject to any disclaimer, the term of this patent is extended or adjusted under 35 U.S.C. 154(b) by 254 days.

(21) Appl. No.: 12/312,471

(22) PCT Filed: Oct. 25, 2007

(86) PCT No.: PCT/JP2007/070805
§ 371 (c)(1),
(2), (4) Date: May 12, 2009

(87) PCT Pub. No.: WO2008/062632
PCT Pub. Date: May 29, 2008

(65) Prior Publication Data
US 2010/0061901 A1    Mar. 11, 2010

(30) Foreign Application Priority Data

Nov. 21, 2006 (JP) ................................. 2006-314896
Oct. 16, 2007 (JP) ................................. 2007-268617

(51) Int. Cl.
*B01J 19/00* (2006.01)
*B01J 8/02* (2006.01)
(52) U.S. Cl. ......... 422/198; 422/211; 422/216; 422/217
(58) Field of Classification Search ............ 422/216, 422/217, 211, 198
See application file for complete search history.

(56) References Cited

U.S. PATENT DOCUMENTS

| 3,493,423 | A | * | 2/1970 | Hartwig ..................... 427/399 |
| 4,956,326 | A | * | 9/1990 | Yoneda et al. ............... 502/178 |
| 5,422,088 | A | | 6/1995 | Burgie et al. |
| 5,755,569 | A | * | 5/1998 | Berg et al. .................... 432/181 |
| 5,853,045 | A | * | 12/1998 | Patry et al. ..................... 165/10 |
| 5,906,799 | A | | 5/1999 | Burgie et al. |
| 6,117,573 | A | * | 9/2000 | Nishioka et al. ............. 428/698 |
| 6,207,305 | B1 | * | 3/2001 | Nishioka et al. ............. 428/698 |
| 6,891,073 | B2 | * | 5/2005 | Kissinger et al. ............ 568/728 |
| 2006/0093975 | A1 | * | 5/2006 | Baker et al. ...................... 431/5 |

(Continued)

FOREIGN PATENT DOCUMENTS

JP     48-047500     7/1973

(Continued)

OTHER PUBLICATIONS

Translation of JP-56-169119—Mar. 2011.*

(Continued)

*Primary Examiner* — Walter D Griffin
*Assistant Examiner* — Huy-Tram Nguyen
(74) *Attorney, Agent, or Firm* — Edwards Wildman Palmer LLP

(57) ABSTRACT

An apparatus for producing trichlorosilane includes a reaction container in which a supply gas containing silicon tetrachloride and hydrogen is supplied therein and a reaction product gas containing trichlorosilane and hydrogen chloride is produced; a heat transfer body which is filled in the reaction container, which is formed of a material having a melting point of at least higher than 1,400° C., and which has a void part which enables a gas to be passed; and a heating mechanism heating the heat transfer body in the reaction container.

8 Claims, 3 Drawing Sheets

U.S. PATENT DOCUMENTS

2007/0178028 A1* 8/2007 Fukasawa et al. ............ 422/220

FOREIGN PATENT DOCUMENTS

| JP | 56-169119 | 12/1981 |
| JP | 62-123011 | 6/1987 |
| JP | 3781439 | 10/1994 |
| JP | 07-232910 | 9/1995 |

OTHER PUBLICATIONS

Translation of JP-48-047500—Mar. 2011.*
Translation of JP-62-123011—Mar. 2011.*
International Search Report mailed Dec. 25, 2007, issued on PCT/JP2007/070805.

* cited by examiner

APPARATUS FOR PRODUCING TRICHLOROSILANE

TECHNICAL FIELD

The present invention relates to an apparatus for producing trichlorosilane which converts silicon tetrachloride into trichlorosilane.

Priority is claimed on Japanese Patent Application No. 2006-314896, filed Nov. 21, 2006 and Japanese Patent Application No. 2007-268617, filed Oct. 16, 2007, the content of which is incorporated herein by reference.

BACKGROUND ART

Trichlorosilane ($SiHCl_3$), which has been used as a raw material for producing extremely high purity silicon (Si: silicon), can be produced by a conversion process of reacting silicon tetrachloride ($SiCl_4$: silicon tetrachloride) with hydrogen.

That is, silicon can be produced by a reductive reaction and thermolysis of trichlorosilane according to the following reaction formulas (1) and (2). Trichlorosilane can be produced by a conversion reaction according to the following reaction formula (3).

$$SiHCl_3 + H_2 \rightarrow Si + 3HCl \qquad (1)$$

$$4SiHCl_3 \rightarrow Si + 3SiCl_4 + 2H_2 \qquad (2)$$

$$SiCl_4 + H_2 \rightarrow SiHCl_3 + HCl \qquad (3)$$

In regard to the apparatus for producing trichlorosilane, for example, Patent Document 1 discloses a double-chamber designed reaction chamber surrounded by a heating body, which includes an outer chamber and an inner chamber which are formed of two tubes arranged concentrically. There has been proposed a reactor in which supply gas of hydrogen and silicon tetrachloride is supplied into the reaction chamber from the lower side and simultaneously, a reaction product gas is discharged from the lower side of the reaction chamber. In regard to the reactor, the heating body which is a heater part made of carbon or the like generates heat by energization thereby heating the inside of the reaction chamber from the outside so as to heat the tubes. The reactor is in a constitution that the gas is heated and reacted while passing a cylindrical channel formed in a concentric manner between the tubes.

Patent Document 1: Japanese Patent No. 3781439

DISCLOSURE OF INVENTION

Problems to be Solved by the Invention

In the related prior art, there remains the following problem.

The reaction of converting silicon tetrachloride into trichlorosilane shows higher conversion efficiency as the high-temperature area inside the converter reactor is larger. However, in the related prior art, since the high-temperature area is limited to an area heated by radiation heat from the heating body outside the reaction chamber, there is a problem that the conversion efficiency is extremely low.

The present invention is made by taking the above-mentioned problem into consideration, and an object of which is to provide an apparatus for producing trichlorosilane which enables efficient heating of the supply gas, thereby contributing to the reaction.

Means for Solving the Problem

In order to solve the above-mentioned problem, the present invention employs the following constitutions That is, an apparatus for producing trichlorosilane of the present invention includes a reaction container in which a supply gas containing silicon tetrachloride and hydrogen is supplied therein and a reaction product gas containing trichlorosilane and hydrogen chloride is produced; a heat transfer body which is filled in the reaction container, which is formed of a material having a melting point of at least higher than 1,400° C., and which has a void part which enables a gas to be passed; and a heating mechanism which heats the heat transfer body in the reaction container.

In the apparatus for producing trichlorosilane, the heat transfer body having a melting point at least higher than 1,400° C. is filled in the reaction container and heated by radiation heat and heat transfer by conduction from the heating mechanism. In addition, because of the void part in the heat transfer body, the area where the supply gas and the heat transfer body come into contact with each other becomes greater, and thus efficient heating can be achieved. Since the supply gas widely spreads through the void parts, it is possible to heat the supply gas over the whole heat transfer body. The reason of using the heat transfer body having the melting point of higher than 1,400° C. is because there may be a case where the heat transfer body is heated up to 1,400° C. for a conversion reaction and it needs to be maintained in a solid state at such a high temperature.

In addition, for the apparatus for producing trichlorosilane of the present invention, the reaction container is equipped with a gas supplying port which introduces the supply gas into the reaction container, a gas discharge port which discharges the reaction product gas outside from the reaction container, and a filling part in which the heat transfer body is filled, in which the gas supplying port is arranged at one end side of the filling part while the gas discharge port is arranged at the other end side. That is, since the gas supplying port is arranged at one end side of the filling part while the gas discharge port is arranged at the other end side in the apparatus for producing trichlorosilane, the supply gas introduced from the gas supplying port flows in a given direction from one end side to the gas discharge port arranged at the other end side in the filling part. For this reason, the supply gas and the reaction product gas flow easily inside the filling part without stagnating and it is possible to efficiently conduct the conversion reaction.

In addition, for the apparatus for producing trichlorosilane of the present invention, the heat transfer body is composed of a plurality of grain aggregates or molded block bodies. Because of the plurality of grain aggregates or block bodies, it is possible to efficiently secure a void space in the heat transfer body.

In addition, for the apparatus for producing trichlorosilane of the present invention, an unevenness is formed on surfaces of the grain aggregates or the molded block bodies. That is, since the grain aggregates or the molded block bodies having the unevenness on the surfaces thereof are employed in the apparatus for producing trichlorosilane, it is possible to widen the area where the supply gas comes into contact. For this reason, it is possible to more efficiently conduct heating.

In addition, for the apparatus for producing trichlorosilane of the present invention, the heat transfer body is selected from any one of polycrystalline silicon, silicon carbide, and carbon of which the surface is coated with silicon carbide. That is, since the heat transfer body employed in the apparatus for producing trichlorosilane is selected from any one of polycrystalline silicon, silicon carbide (SiC), and carbon of which the surface is coated with silicon carbide, impurities are hardly generated and it is possible to obtain a high thermal conductivity and a high heating efficiency.

Advantageous Effects of The Invention

According to the present invention, the following effects are exhibited.

That is, in an apparatus for producing trichlorosilane according to the present invention, a heat transfer body, which is formed of a material having a melting point of at least higher than 1,400° C. and has a void part which enables a gas to be passed, is filled in a reaction container and thus heated. For this reason, the area where the supply gas comes into contact becomes larger, and thus efficient heating can be achieved. An effective conversion reaction can be performed due to the high heating efficiency. Accordingly, the conversion rate to trichlorosilane can be increased.

BRIEF DESCRIPTION OF THE REFERENCE SYMBOLS

1. Reaction container, 1a. Gas supplying port, 1b. Gas discharge port, 2. Grain aggregate (Heat transfer body), 2a. Void part, 3. Heating mechanism, 3a. Heater part, 3b. Electrode part, 4. Filling part, 5. Partition plate, 5a. Gas inflow hole, 22. Molded block body (Heat transfer body), 22a. Main body part, 22b. Convex part, 22c. Void part.

BEST MODE FOR CARRYING OUT THE INVENTION

Embodiments of an apparatus for producing trichlorosilane according to the present invention will be described below with the reference to drawings. At first, a first embodiment will be described with reference to FIG. 1.

Figure 1:
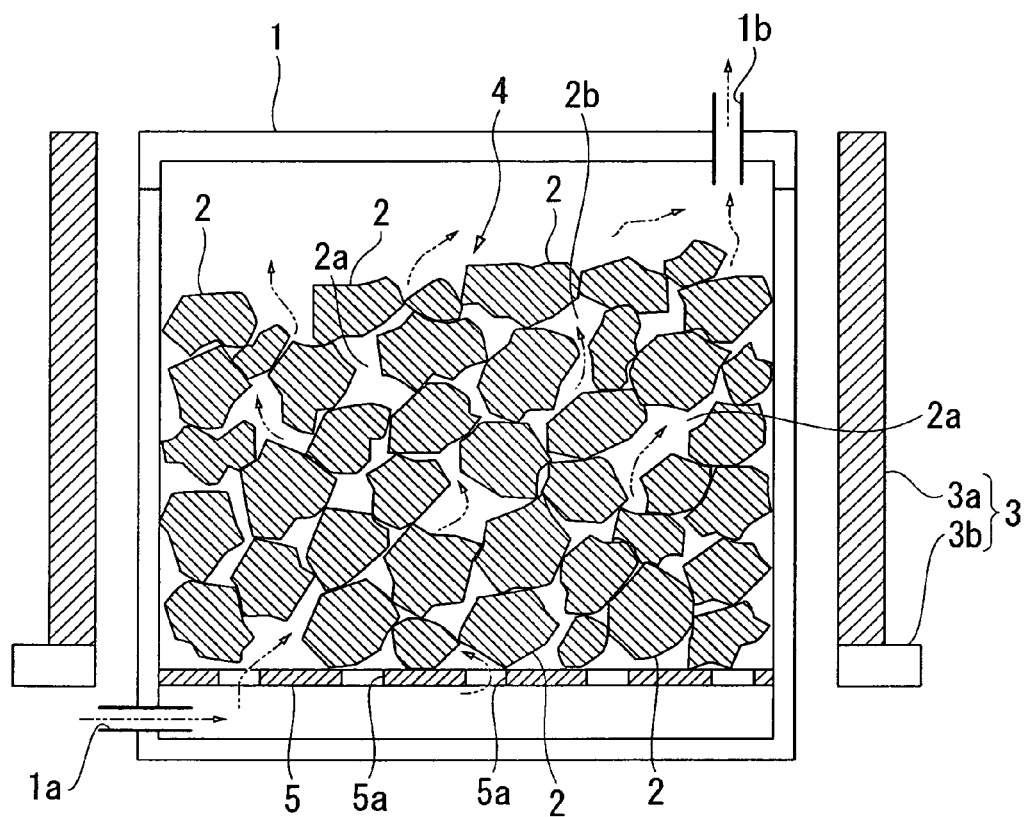
FIG. 1 is a cross-sectional view simply illustrating a first embodiment of an apparatus for producing trichlorosilane according to the present invention.

As shown in FIG. 1, the apparatus for producing trichlorosilane of the present embodiment includes a reaction container 1 in which a supply gas containing silicon tetrachloride and hydrogen is supplied therein and a reaction product gas containing trichlorosilane and hydrogen chloride is produced; a plurality of grain aggregates 2 serving as a heat transfer body which is filled in the reaction container 1, heated by radiation heat and heat transfer by conduction, and has a melting point of at least higher than 1,400° C.; and a heating mechanism 3 which is arranged around the reaction container 1 and heats the grain aggregates 2 in the reaction container 1 by radiation heat and heat transfer by conduction.

The reaction container 1 is equipped with a gas supplying port 1a which introduces the supply gas inside the reaction container, a gas discharge port 1b which discharges the reaction product gas outside the reaction container, and a filling part 4 in which the plurality of grain aggregates 2 is filled. In addition, the gas supplying port 1a is arranged on the lower side (one end side) of the filling part 4 while the gas discharge port 1b is arranged on the upper side (the other end side) thereof.

The grain aggregates 2 are selected from any one of extremely high purity polycrystalline silicon, silicon carbide, and carbon of which the surface is coated with silicon carbide. Especially, grain aggregates in which an unevenness is formed on the surfaces thereof are employed.

In addition, the size and the amount of the grain aggregates 2 to be filled are appropriately set according to the flow rate of the supply gas to be passed, the size (filling capacity) of the filling part 4, and the like. When the plurality of grain aggregates 2 is filled, inside the filling part 4 becomes the state where void parts 2a which are gaps between the grain aggregates 2 enabling gas to pass therethrough are intricately formed.

The filling part 4 is constituted on a partition plate 5 installed in the manner of leaving a certain space empty from the bottom of the reaction container 1. In the space between the partition plate 5 and the bottom of the reaction container 1, the gas supplying port 1a is installed to introduce the supply gas. In addition, a plurality of gas inflow hole 5a having a diameter smaller than an outside diameter of the grain aggregate 2 is formed in the partition plate 5. From these gas inflow holes 5a, the supply gas flows into the filling part 4. The gas supplying port 1a is connected to a supply source (not shown in the drawing) of the supply gas.

That is, the supply gas flowed from the gas inflow holes 5a passes through the void parts 2a, which are gaps between the grain aggregates 2 in the filling part 4, toward the upper side. At that time, the gas is heated while being in contact with the surface of the grain aggregates 2 and thus undergoes reaction to give a reaction product gas. The reaction product gas is eventually discharged outside from the gas discharge port 1b at the upper side.

The heating mechanism 3 includes a heater part 3a, which is a heating body arranged around the reaction container 1 in the manner of enclosing the reaction container 1 and an electrode part 3b, which is connected to the bottom of the heater part 3a and applies an electrical current to the heater part 3a. The electrode part 3b is connected to a power source which is not shown in the drawing. In addition, the heating mechanism 3 carries out a heating control for the temperature for the grain aggregates 2 in the reaction container 1 to be in the range of 800° C. to 1,400° C. When the temperature of the grain aggregates 2 is set higher than 1,200° C., the conversion rate into trichlorosilane increases. Moreover, disilanes may be introduced as the supply gas to discharge silanes.

As described above, in the embodiment, the plurality of grain aggregates 2 having the melting point of greater than 1,400° C. is filled in the reaction container 1 and heated by the radiation heat and the heat transfer by conduction from the heating mechanism 3. In addition, there are many void spaces because of the void parts 2a formed between the grain aggregates 2. Therefore, the area where the supply gas and the grain aggregate 2 come into contact with each other becomes greater, and thus efficient heating can be achieved. In addition, since the supply gas widely spreads through the void parts 2a between the grain aggregates 2, it is possible to heat the supply gas over the whole filling part 4.

In addition, since the grain aggregates 2 having the unevenness on the surfaces thereof are employed, it is possible to widen the contact area with the supply gas, and heating can be more efficiently achieved.

Especially, since a plurality of grain aggregates 2 selected from any one of polycrystalline silicon, silicon carbide, and carbon of which the surface is coated with silicon carbide is employed, impurities are hardly generated and it is possible to obtain a high thermal conductivity and a high heating efficiency. When the carbon coated with silicon carbide is used as the grain aggregates 2, since the coating of silicon carbide protects the carbon, it is possible to prevent the carbon from reacting with hydrogen, chlorosilane, hydrogen chloride, which are contained in the supply gas and the reaction product gas, and to prevent the generation of impurities such as methane, methyl chlorosilane, and silicon carbide.

In addition, since the gas supplying port 1a is arranged on the lower side of the filling part 4 while the gas discharge port 1b is arranged on the upper side thereof, the supply gas introduced from the gas supplying port 1a flows in a given direction from the lower side to the gas discharge port 1b arranged on the upper side in the filling part 4. For this reason, the supply gas and the reaction product gas flow easily without being blocked in the filling part 4. As a result, it is possible to efficiently conduct the conversion reaction. In the drawing, a flow direction of the gas is shown by arrows.

Secondly, a second embodiment of the apparatus for producing trichlorosilane according to the present invention will be described below with reference to FIGS. 2, 3A, and 3B. In addition, in the below description of the embodiment, the same constituent elements as those described in the above embodiment will be given the same reference numerals and signs and the description thereof will be omitted.

Figure 2:
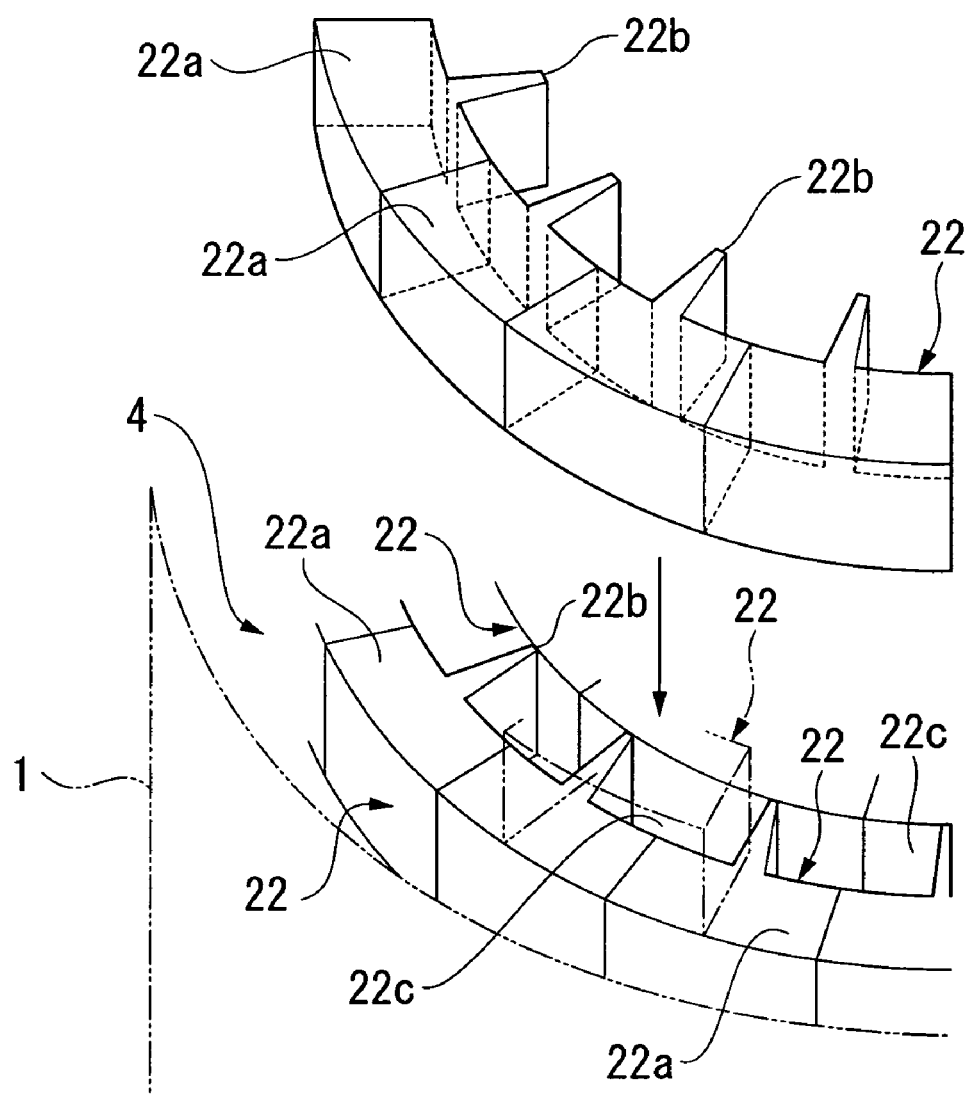
FIG. 2 is an enlarged perspective view of a main part illustrating a state of block bodies being stacked in a second embodiment of an apparatus for producing trichlorosilane according to the invention.
Figure 3A:
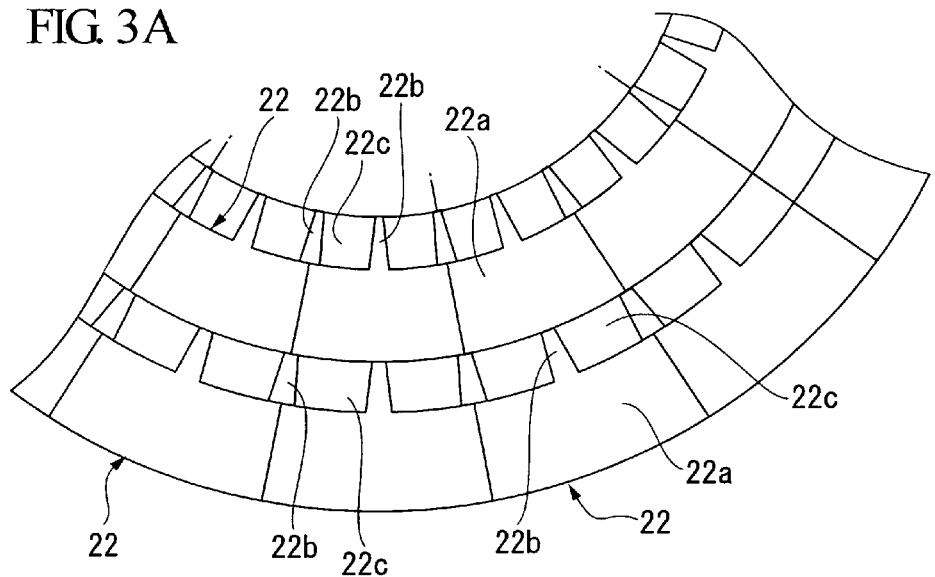
FIG. 3A is a plane view illustrating the stacked state of block bodies in the second embodiment.
Figure 3B:
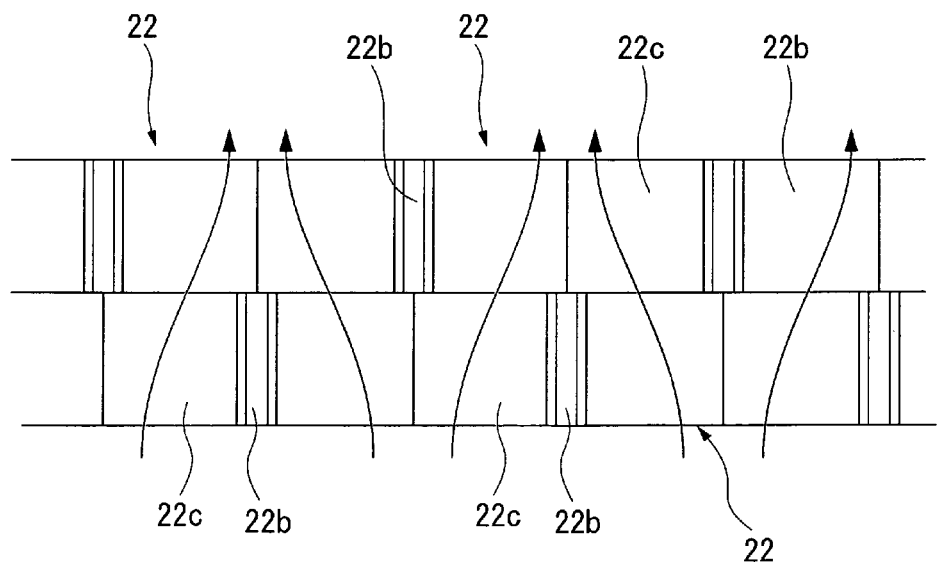
FIG. 3B is a side view seen from the inside radius side of the stacked state of block bodies in the second embodiment.

The difference between the second embodiment and the first embodiment is that the plurality of grain aggregates 2 is filled in the filling part 4 as the heat transfer body in the first embodiment, while a molded block body 22 is used as the heat transfer body and is filled in a row in the filling part 4 in the second embodiment as shown in FIG. 2. That is, in the apparatus for producing trichlorosilane of the second embodiment, as shown in FIGS. 2 and 3A, a plurality of block bodies 22 molded to have a nearly circular arc shape are arranged to be multiple annular shapes having various diameters and are piled up.

The block body 22 is constituted by a main body part 22a having a nearly circular shape and a convex part 22b projected from inside the main body part 22a. The block body 22 may be arranged in a row to have a plurality of circular ring shapes, which is in contact with each other in the filling part 4 of a cylindrical shape having a bottom. In addition, another block body may be stacked thereon. Spaces among the convex parts 22b in each block body 22 become void parts 22c which pass the gas. When each block body 22 is arranged in a row to have the circular ring shape and also stacked in plural, as shown in FIG. 3B, the upper and lower adjacent block bodies 22 are arranged in a manner of circumferentially crisscrossed so that the convex parts 22b in the top and the bottom are set to be unmatched with each other. That is, because the convex parts 22b in the top and the bottom are set to be unmatched with each other, the void parts 22c are tortuously continuous. The supply gas and the reaction product gas pass through the tortuously continued void parts 22c.

Accordingly, since the block bodies 22 are charged in a row to have many spaces among each other in the filling part 4 in the second embodiment, it is easy to be increase the temperature and the area where the supply gas and the block bodies 22 are in contact becomes larger in the same manner as in the first embodiment. For this reason, it is possible to more efficiently conduct heating. In addition, since the supply gas widely spreads through the void parts 22c among the block bodies 22, it is possible to heat the supply gas over the whole filling part 4.

The technical scope of the present invention is not limited by above-mentioned embodiments and it is possible to apply various changes without departing from the scope of the present invention.

For example, in each above-mentioned embodiment, the supply gas is introduced from the lower side of the filling part 4 while the reaction product gas is discharged from the upper side thereof. However, the introduction and discharge of the gas may be carried out from other directions. For example, the supply gas may be introduced from one side in a transverse direction of the filling part 4 and the reaction product gas may be discharged from the other side in the transverse direction thereof.

In addition, in each above-mentioned embodiment, the heat transfer bodies constituted by a plurality of grain aggregates or a plurality of block body. However, the heat transfer body may be constituted by one molded block body chargeable to the filling part in the reaction container. For example, a molded block body in which void parts are formed from the surface to the inside thereof by a constitution including a combination of a column-shaped part and a plate-shaped part may be used as the heat transfer body.

Industrial Applicability

According to the present invention, it is possible to provide an apparatus for producing trichlorosilane which enables efficient heating of supply gas, thereby contributing to the reaction.

The invention claimed is:

1. An apparatus for producing trichlorosilane, comprising:
a reaction container in which a supply gas containing silicon tetrachloride and hydrogen is supplied therein and a reaction product gas containing trichlorosilane and hydrogen chloride is produced;
a heat transfer body which is filled in the reaction container, which is formed of a material having a melting point of at least higher than 1,400° C., and which has a void part which enables a gas to be passed; and
a heating mechanism including a cylindrical tubular heater arranged around the reaction container in a manner of enclosing the reaction container and an electrode connected to a bottom of the cylindrical tubular heater which heats the heat transfer body in the reaction container, wherein,
the heat transfer body is carbon with a surface thereof coated with silicon carbide.

2. The apparatus for producing trichlorosilane according to claim 1,
wherein the reaction container is equipped with a gas supplying port which introduces the supply gas into the reaction container,
a gas discharge port which discharges the reaction product gas outside from the reaction container, and
a filling part in which the heat transfer body is filled,
wherein the gas supplying port is arranged at one end side of the filling part while the gas discharge port is arranged at the other end side.

3. The apparatus for producing trichlorosilane according to claim 1,
wherein the heat transfer body is composed of a plurality of grain aggregates or molded block bodies.

4. The apparatus for producing trichlorosilane according to claim 3,
wherein an unevenness is formed on surfaces of the grain aggregates or the molded block bodies.

5. The apparatus for producing trichlorosilane according to claim 2,
wherein the gas supplying port is arranged on a lower side of the filling part,
the gas discharge port is arranged on an upper side of the filling part, and
the gas supplying port is arranged diagonally across from the gas discharge port.

6. The apparatus for producing trichlorosilane according to claim 2,
wherein the gas supplying port is arranged on one side in a transverse direction of the filling part and the gas discharge port is arranged on other side in a transverse direction of the filling part.

7. The apparatus for producing trichlorosilane according to claim 2,
wherein the gas supplying port is arranged on a lower part of a side surface of the reaction container,
the gas discharge port is arranged on an upper surface of the filling part, and
the gas supplying port is arranged diagonally across from the gas discharge port.

8. The apparatus for producing trichlorosilane according to claim 1, wherein the reaction container has a longer diameter than a height thereof.

* * * * *